United States Patent Office 3,453,245
Patented July 1, 1969

3,453,245
SPRAY-REACTED PARTICULATE CARBOXYLIC POLYMER-INORGANIC BASE COMPOSITIONS
Frank J. Glavis, Rydal, Pa., assignor to Rohm & Haas Company, Philadelphia, Pa., a corporation of Delaware
No Drawing. Filed June 29, 1965, Ser. No. 468,128
Int. Cl. C08f 47/02, 15/40
U.S. Cl. 260—78.5     3 Claims

ABSTRACT OF THE DISCLOSURE

Aqueous dispersions of water-insoluble emulsion addition copolymers of an acid monomer are converted into a dry, finely-divided composition which is water-soluble. This is accomplished, for example, by simultaneously spray drying the aqueous dispersion of water-insoluble copolymer and an aqueous solution of an alkaline compound of an alkali metal.

---

The present invention is concerned with the conversion of aqueous dispersions of water-insoluble emulsion copolymers of an acid monomer into a dry, finely-divided powdered form to provide a water-soluble composition formed of the water-insoluble acid copolymer and a base or to provide a readily redispersible dry composition in which the amount of base (including any uncombined as well as any combined with the acid copolymer) is less than the amount required to render the partially neutralized copolymer obtained on dispersion completely water-soluble. In the latter case, before or after redispersion additional basic material may be added to obtain a clear polymer solution.

U.S. Patent 2,566,149 discloses the preparation of granular polymethacrylic acid by the spray drying thereof. The polymethacrylic acid, of course, is of water-soluble character.

In contrast with the patented procedure, the present invention is concerned with the production of a water-soluble composition in dry powdered form from an aqueous dispersion of an emulsion copolymer comprising acid units which copolymer is of water-insoluble character. In accordance with the present invention it has been found that a dry, powdery, water-soluble composition can be formed by simultaneously spray drying the aqueous dispersion of water-insoluble copolymer and an aqueous solution of an alkaline compound of an alkali metal, the spray drying being carried out in zones of a heated air stream which are adjacent and preferably partially overlapping or essentially of the same extent so that at least a portion of the zone in which the polymer is spray dried merges with a portion of the zone in which the alkali metal base is spray dried.

Any suitable equipment for effecting spray drying may be employed. For example, the equipment may comprise a vertical duct in which there is disposed a spray head or nozzle provided with a plurality of feed ducts, one or more of which is supplied with the aqueous polymer dispersion and one or more of which is supplied with the alkaline solution. Alternatively, instead of the spray head or nozzle just described, there may be more or less concentrically located within the duct a vertical shaft carrying at its lower end a pair of small discs spaced axially from each other along the shaft by a short distance so that a feed pipe for the aqueous polymer dispersion may direct such dispersion to the top surface of the upper rotating disc and a feed pipe may extend between the discs for feeding the alkaline solution to the lower disc. The discs may have diameters ranging from about an inch to 6 inches and they may be spaced apart by about half an inch to an inch or more. The shaft may be driven at high speeds such as from a thousand to 60,000 r.p.m.

In either the spray or disc type of system, the heated air may be passed in either direction within the main duct, that is from the top to the bottom or from the bottom to the top. The spray nozzle or disc arrangement may be mounted centrally relative to the height of the main duct or it may be mounted at the top thereof or even near the bottom thereof. Depending upon the speed of the flow of heated gas within the main duct, the dried powders may be carried out the top of the main duct by an upwardly flowing gas stream or it may be carried downwardly and out of the main duct by the downwardly passing stream of heated gas. The discharged powder carrying gas stream can then be passed into a suitable separator such as the typical cyclone type. If the rate of flow of the heated gas stream is relatively low, the powder may simply descend in the main duct to the bottom thereof which may be provided with a suitable collector. These types of equipment are well known and it is to be understood also that any other suitable equipment may be used to carry out the process hereinafter described.

The emulsion copolymers may be those having any molecular weight and containing from 3% to 70% by weight of acid units in the copolymer. The acid component may be derived from acrylic acid, methacrylic acid, itaconic acid, aconitic acid, maleic acid, fumaric acid or any other acid monomer having a group of the formula $H_2C=C<$ or $-C(H)=C<$.

The acid may be copolymerized by any conventional emulsion polymerization procedure with 30 to 97% by weight of at least one other ethylenically unsaturated monomer having a group $H_2C=C<$. Examples include the nitriles and esters of acrylic acid or methacrylic acid with an alkanol having from 1 to 18 carbon atoms, vinyl esters of saturated aliphatic acids having from 1 to 18 carbon atoms, vinyl aromatic hydrocarbons such as styrene, any of the vinyltoluenes, vinyl chloride, vinylidene chloride, ethylene, propylene, and isobutylene. Examples of the acrylic esters include methyl acrylate, methyl methacrylate, ethyl acrylate, butyl acrylate, butyl methacrylate, 2-ethylhexylacrylate and methacrylate, lauryl acrylate and methacrylate and stearyl acrylate and methacrylate. Examples of vinyl esters include vinyl acetate, which is preferred, vinyl propionate, vinyl laurate and vinyl stearate. Besides the monomers of essentially hydrophobic character just described, the copolymers may contain hydrophilic monomers when the content of acid relative to the content of hydrophobic comonomer or comonomers is insufficient even with the hydrophilic comonomer to render the polymer water-soluble. Examples of such hydrophilic monomers include acrylamide, methacrylamide, N-methylolacrylamide, 2-hydroxyethyl acrylate, and dimethylaminoethyl methacrylate.

The concentration of the polymer dispersion is not particularly critical but ordinarily the emulsion polymer may be produced at relatively high concentrations from 35 to 60% solids so that the concentration of the dispersion supplied to the spray equipment may be from as low as 5% to 60% solids. However, it is ordinarily not economical to use the polymer dispersions at a concentration lower than 10 or 15% by weight so that preferably the solids concentration of the polymer dispersion as supplied to the spray equipment should be above 15% and may range up to about 48%.

As the base solution there may be used an aqueous solution of an alkali metal hydroxide or carbonate, such as those of sodium, potassium or lithium, or ammonium carbonate and the concentration may be from 10% to 40% within the saturation limits. It is disadvantageous to use too high a concentration in either the polymer dispersion or the base solution in that the dried components tend to be of larger particle size and not as well distributed among each other in the dry product.

The temperature of the gaseous atmosphere passed through the main duct into which the aqueous polymer dispersion and the base solution are sprayed may be from about 100° C. to 300° C. at the point of introduction into the main duct and the outlet temperature may be from about 35° C. to 125° C. The rate of flow of the gaseous atmosphere through the chamber is correlated with its temperature to assure that under the conditions of spraying the atomized droplets undergo substantially complete evaporation before the dried particles can come into contact with the internal surface of any confining walls and specifically that of the main duct. In other words, the particles are dried sufficiently so that they are not tacky and do not stick to the walls of the equipment. Depending upon the particular polymer and the temperature at which it softens, the temperature of the gaseous stream is selected to avoid exceeding the melting point of the polymer, as it approaches the walls or is discharged through the outlet of the main duct. Again this is to prevent adhesion of fused polymer to the walls.

The gaseous atmosphere may simply be air or in the event that the polymer may tend to deteriorate in the heated air, an inert gas may be used instead such as nitrogen, carbon dioxide, helium or the like.

The polymer dispersion may be preheated as it approaches the nozzle or disc to a temperature below the boiling point. Similarly, the base solution may be preheated. The temperature to which these dispersions may be preheated may be from 30 to 95° C.

The amount of base in the alkaline solution preferably does not exceed the stoichiometric equivalent of the acid in the copolymer. However a lesser proportion may be employed such as from about 50% of the stoichiometric equivalent to 95% or more. Preferably, at least sufficient base is included to assure that the particular acid copolymer with which it is used is rendered water-soluble when the acid groups are neutralized by the proportion of base supplied.

The product is believed to contain a mixture of fine particles of the basic material such as caustic soda, finely divided particles of acid polymer, and finely divided particles of at least partially neutralized acid polymer. These components are so intimately and thoroughly distributed among themselves in the product, that when the product is introduced into water, complete solution occurs quite rapidly.

The advantages of the present invention over the normal procedures for producing a water-soluble salt of a water-insoluble acid copolymer include:

(1) The avoidance of excessive viscosity and/or coagulation commonly obtained when an acid copolymer dispersion is supplied with sufficient alkaline material to neutralize the acid groups therein.

(2) Avoidance of the difficulty of removing water from viscous materials.

(3) Elimination of a grinding step whether performed on a wet or dry material.

(4) The present invention makes it possible to provide economically a dispersible acid polymer composition while avoiding coagulation and thickening resulting from pre-mixing base and acid polymer in an aqueous medium.

The powdered composition may be used for the sizing of textiles, paper, and the impregnation of leather. It may be used as an adhesive in its own right by the addition of a small amount of water. It may also be used as a sealing composition. For this purpose it may be combined with a large proportion of filler materials such as whiting, clay, barytes and the like. It may be compounded with other materials such as aminoplasts, phenoplasts, cellulose esters or ethers, poly(vic-epoxy) resins, and natural and artificial latices of rubber and synthetic emulsion polymers of rubber type or of vinyl or acrylic esters, etc.

To obtain a free-flowing, powdered product which is not tacky and adhesive so that it does not adhere to the walls of the spray equipment, it is preferred that the acid polymer have a $T_i$ value of at least about 50° C. when determined at 300 kg./cm.$^2$. The $T_i$ value referred to is the apparent second order transition temperature or inflection temperature which is found by plotting the modulus of rigidity against temperature. A convenient method for determining modulus of rigidity and transition temperature is described by I. Williamson, British Plastics 23, 87–90, 102 (September 1950).

To assist those skilled in the art to practice the present invention, the following modes of operation are suggested by way of illustration, parts and percentages being by weight and the temperatures in ° C. unless otherwise specifically noted.

(1) An aqueous dispersion or latex (40% solids) of a water-insoluble copolymer of 40% ethyl acrylate, 45% methyl methacrylate, and 15% methacrylic acid prepared by emulsion copolymerization at 90–95° C. in deionized water containing about 0.3%, based on monomer weight, of sodium lauryl sulfate and 0.15%, based on monomer weight, of ammonium persulfate (the latex having a pH of 1.6–2.0, a viscosity of 15–25 cps., and a viscosity average molecular weight of about 150,000) is diluted with deionized water to 35% polymer solids, and a solution of 75 grams of sodium hydroxide (representing 90% of stoichiometry, based on the acid content of the polymer) in 300 grams of deionized water is prepared as a second feed. The latex is then fed through three of four atomizing nozzles of a spray drying unit, the rate of flow maintained by a pump. Simultaneously, the caustic solution is pumped at a proportionate rate and atomized through the fourth nozzle, so that the two feed streams are introduced into the drying chamber at a proportionate rate. The latex is introduced at a rate of about 70 grams per minute, the caustic solution at about 7.7 g./min., and the drying air is fed in at a temperature of 160° C. and at a rate of 50 c.f.m. (cubic feet per minute). This provides an outlet air temperature of 65° C. and permits the collection of the product as a fine, white, free-flowing powder. This product powder has a moisture content of 2.0%, a bulk density of about 0.4, a 5% aqueous solution pH of 7.5, a 5% solution viscosity of about 20 cps. The intrinsic viscosity of the polymer is essentially unchanged after the spray drying operation, and the acid carboxyl (including both neutralized and unneutralized) content of the copolymer is found to be 15.5%, essentially the same as the acid concentration of the initial monomer mix in the polymerization.

(2) Procedure (1) is repeated except that the latex is fed at a rate of 50 g. per min., the caustic solution is replaced by a solution of 171 g. of ammonium carbonate in 750 g. of water which is fed to the spray nozzle at a rate of about 18.2 g. per minute.

(3) A 40% polymer solids latex containing a copolymer of 50% ethyl acrylate, 17% methyl methacrylate, and 33% acrylic acid obtained by emulsion copolymerization as in (1) above is fed to the lower of two integrally joined centrifugal discs rotating at 5,000 r.p.m. at a rate of 60 g. per min. and a solution of 420 g. of sodium carbonate in 1,200 g. of water is fed to the upper disc at a rate of 28.5 g. per min. Drying air is fed from below into the chamber surrounding the discs at 180° C. at a rate of 30 c.f.m., the effluent air leaving the top of the chamber at about 62° C. The white, dry, free-flowing powder is collected from the bottom of the chamber and is readily dissolved in water.

(4) A copolymer latex is prepared by the method of (1) above but with a monomer mix consisting of 30 parts of ethyl acrylate and 70 parts of methacrylic acid. The polymer latex is diluted to a polymer content of 20.0%. Two supply systems are provided, one with 1,000 parts of the 20% polymer latex and the other with 88.4 parts of sodium carbonate dissolved in 1,000 parts of deionized water. These two supplies are then fed, simultaneously and proportionately, to separate atomizing discs of a spray drying unit equipped with two, rotating, flat discs, fixedly mounted on a common shaft one above the other with a separation of about one-half inch. The discs have a diameter of 4.75 inches and are rotated at 24,000 r.p.m. Heated air is passed over the atomizing discs at a flow rate of about 50 c.f.m., and the inlet air temperature is maintained at 130° C. The feed streams are added at a rate of 50–60 ml. per minute, and a fine-free-flowing powder is obtained as the product, with an outlet air temperature of 45–50° C. The product is readily soluble in water and gives a 3% solution with a viscosity of 10,000 cps.

(5) A 35.1% solids polymer latex is made as in (1) above from a monomer mix consisting of ethyl acrylate: methyl methacrylate:methacrylic acid, in the proportions 47.5:49.5:3. Two feeds were prepared: (a) 600 parts of the 35.1% polymer latex, and (b) 4.2 parts of sodium carbonate in 300 parts of de-ionized water. As in (1), these two supplies were fed simultaneously and proportionately over a period of fifteen minutes, with the conditions and equipment for spray drying being those listed in (1) above, except for the inlet air temperature (125° C.) and the outlet air temperature (45° C.). The polymer gives an approxiamtely neutral solution (pH 8) in water.

(6) The process of (1) above is repeated except that the polymer is prepared from a monomer mixture consisting of ethyl acrylate:methyl methacrylate:methacrylic acid, 50:17:33. The polymer has an intrinsic viscosity in acetone at 30° C. of 1.5 deciliters per gram. The two feed supplies consist of (a) 1,000 parts of the polymer latex at 40% polymer solids, and (b) 54 grams (90% of stoichiometry relative to acid in the copolymer) of sodium hydroxide dissolved in 250 parts of water. With the other spray drying conditions as described in (1) above, the inlet air temperature is held at 165° C. while the outlet air temperature is 65° C. The free-flowing powder obtained as product dissolves in water to provide a 5% aqueous solution with a pH of 7.5 and a viscosity of 500 cps.

(7) The procedure of (1) above is repeated with the polymer latex prepared from ethyl acrylate:methyl methacrylate:methacrylic acid, 40:45:15. The polymer has an intrinsic viscosity in acetone at 30° C. of 0.17. The two feeds for the spray drying step consist of (a) 1,500 parts of the 30% polymer latex and (b) 40 grams of sodium carbonate dissolved in 500 parts of water. The two feed streams are introduced simultaneously and proportionately under the conditions of (1) above, except that the inlet air temperature is 130° C. and the outlet air temperature is 60° C. The product gives a clear aqueous solution with a 5% solution pH of 8.3 and a viscosity of 15 cps.

(8) The process of (7) above is repeated exactly, except that the feed supply (b) consists of 36 parts of ammonium carbonate in 500 parts of water. The product is a free-flowing white powder which gives a neutral aqueous dispersion with a pH of 6.8 and a viscosity of 10 cps.

I claim:
1. A process of producing a dry, particulate, water-soluble composition which comprises passing a stream of gas heated to a temperature of about 100° C. to 300° C. through a channel, dispersing a stream of an aqueous dispersion, having a concentration of 10 to 48% solids, of a water insoluble emulsion copolymer, containing 3 to 70% of acid groups in the copolymer and derived from an $\alpha,\beta$-ethylenically unsaturated carboxylic acid and another ethylenically unsaturated monomer, into a spray of atomized droplets in a zone traversed by the gas stream within the channel, simultaneously dispersing a stream of an aqueous solution of an alkali metal hydroxide or carbonate or ammonium carbonate having a concentration of about 10 to 40% by weight into a spray of atomized alkaline droplets in a zone traversed by the gas stream within the channel, at least a portion of the latter zone merging with a portion of the first-mentioned zone so that copolymer-containing droplets make contact with alkaline droplets, the water in the droplets is evaporated, and essentially dry particles of copolymer, particles of hydroxide or carbonate, and particles of at least partially neutralized copolymer are produced and thoroughly mixed together in the channel, the amount of hydroxide or carbonate dispersed being at least 50% but not above the stoichiometric equivalent of the carboxylic acid groups, and then separating the mixed powder from the gas stream.

2. The process of claim 1 in which the acid is selected from the group consisting of acrylic acid, methacrylic acid, itaconic acid, aconitic acid, maleic acid, fumaric acid, or any other $\alpha,\beta$-ethylenically unsaturated carboxylic acid having a group of the formula $H_2C=C<$ or $$-C(H)=C<$$

or mixtures thereof, the comonomer in the copolymer comprises an alkyl acrylate or an alkyl methacrylate, or mixtures thereof, and the copolymer has a $T_1$ value of at least 50° C. when determined at 300 kg./cm².

3. The process of claim 2 in which the polymer is a copolymer of ethyl acrylate or methyl methacrylate or both with acrylic acid or methacrylic acid or both.

References Cited

UNITED STATES PATENTS 2,607,762 8/1952 Bowen _____ 260—78.5
2,566,149 8/1951 Strain _____ 260—80
2,763,633 9/1956 Gray _____ 260—78.5

JOSEPH L. SCHOFER, Primary Examiner.
STANFORD M. LEVIN, Assistant Examiner.

U.S. Cl. X.R.

260—80, 80.3, 80.8, 86.1